L. MORSE.
Method of Uniting Glass and Enamel to Metal.

No. 226,770. Patented April 20, 1880.

WITNESSES:

INVENTOR:
L. Morse
BY
ATTORNEYS.

United States Patent Office.

LEWIS MORSE, OF NORTH ATTLEBOROUGH, MASSACHUSETTS, ASSIGNOR TO E. IRA RICHARDS, OF SAME PLACE.

METHOD OF UNITING GLASS AND ENAMEL TO METAL.

SPECIFICATION forming part of Letters Patent No. 226,770, dated April 20, 1880.

Application filed December 5, 1879.

*To all whom it may concern:*

Be it known that I, LEWIS MORSE, of North Attleborough, in the county of Bristol and State of Massachusetts, have invented a new and Improved Method of Uniting Glass and Enamel to Metal, of which the following is a specification.

Figure 1:
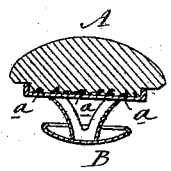
Figure 2:
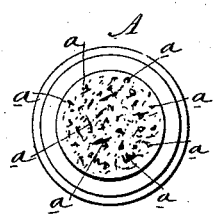
Figure 3:
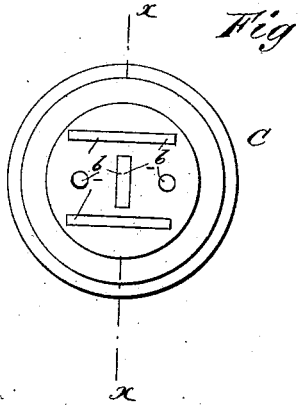
Figure 4:
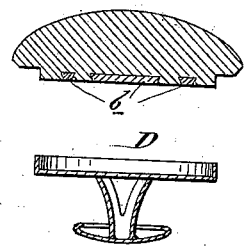

Figure 1 is a sectional elevation of a button with glass or enamel top or disk united to a metallic shank. Fig. 2 is a plan of the under side of the said top or disk. Fig. 3 is a plan of the under side of the top or disk of a larger button or stud. Fig. 4 represents a sectional elevation of Fig. 3 on line $x\ x$ and an elevation of the shank of the same.

Similar letters of reference indicate corresponding parts.

The object of this invention is to provide a cheap, simple, and novel method whereby, in the manufacture of buttons, studs, and other ornamental articles of jewelry and dress that consist partly of glass, enamel, or cement, the glass, enamel, or cement portions may be readily and firmly united to the metallic parts.

The invention consists in introducing upon the surface of glass, enamel, or cement, when put in the mold to be shaped into buttons, studs, &c., small pieces of brass, silver, copper, gold, or other suitable metal, of regular or irregular shape, and incorporating them with the plastic glass or enamel by the same pressure that forms the disk or top of the stud or button in such a manner that they shall be flush with the surface of the under side of the stud or button disk, and shall present faces or points of metal to which the stud or button shank may be soldered.

In the manufacture of studs, buttons, breastpins, and other articles of dress and jewelry consisting in part of glass or enamel or cement, the glass, enamel, or cement top or disk is usually provided with an annular groove on its under face, and the metallic shank or plate is provided with a corresponding annular collar or rim, and the two are united by pressing the said collar or rim into the annular groove. This process requires skilled labor, the work is slow, and the parts are rarely as firmly united as they should be.

In order to lessen the manufacturing cost of these articles, and to make them of greater strength and durability, I render glass or enamel plastic by heat, place it in a mold, throw scraps of brass or other suitable metal on its exposed surface, and then apply pressure to form the disk or top, and at the same time incorporate the metal scraps with it. To this top or disk the shank or plate is readily and firmly united by solder, which attaches itself as well to the metal scraps that are exposed in the under face of the disk as to the shank itself.

In the drawings, A, Figs. 1 2, represents the glass, enamel, or cement disk or top, and B the shank, of a button or stud, and $a$ indicates metallic scraps embedded in the under face of the disk A.

In Figs. 3 and 4 are seen metallic bars, rods, or strips $b$, embedded in the disk C of the glass or enamel disk or top of a larger article of jewelry, and D represents the shank thereof. In the manufacture of the larger articles I make fewer and larger points of attachment for the solder than in the smaller articles.

Having thus described my invention, I claim as new and desire to secure by Letters Patent—

The within-described method of uniting glass, enamel, and cement to metal, consisting in embedding or incorporating pieces of metal, by pressure, in the face of a plastic disk or top of the glass, enamel, or cement, and in then joining the disks of glass, enamel, or cement to the metal plate by means of solder, substantially as herein set forth.

LEWIS MORSE.

Witnesses:
 THOS. G. SANDLAND,
 FRANCIS B. RICHARDS.